Patented Oct. 3, 1922.

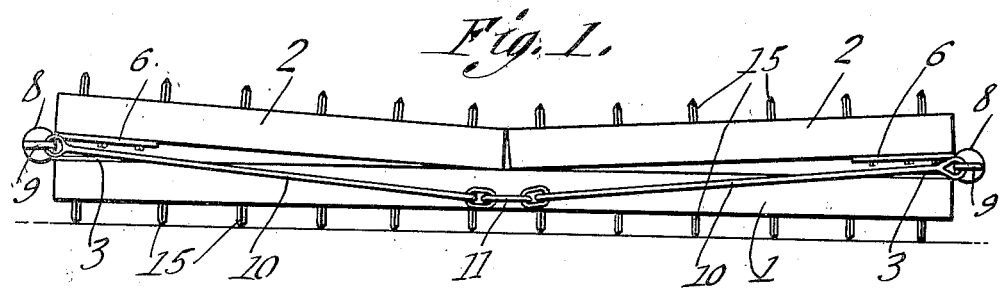
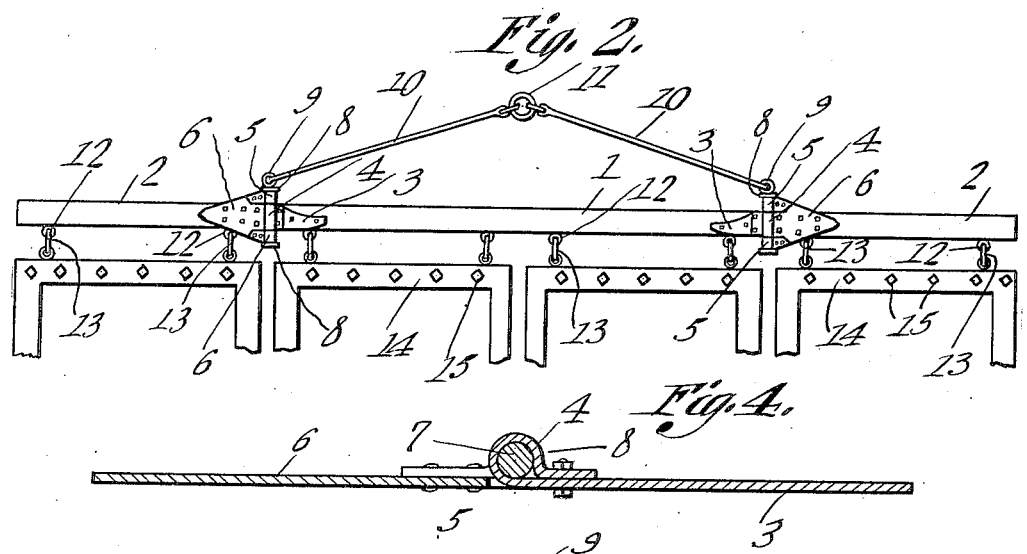
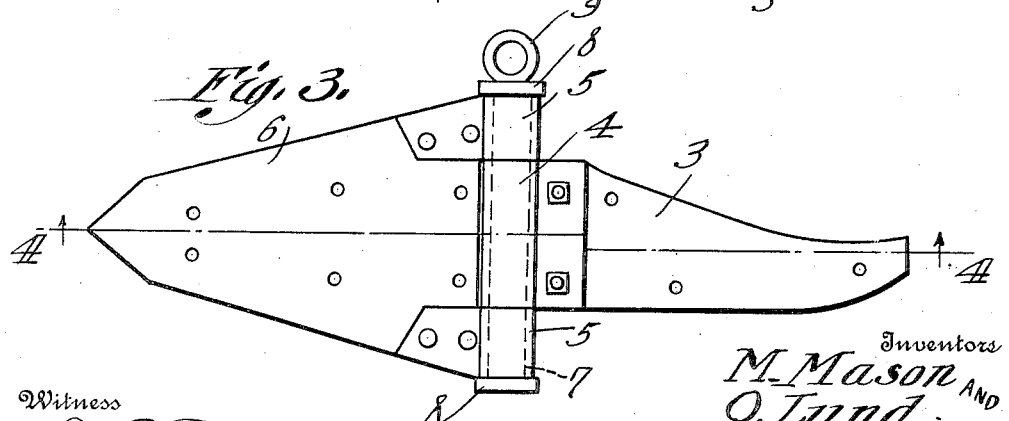

1,430,825

UNITED STATES PATENT OFFICE.

MARTIN MASON AND OLE LUND, OF CALAMUS, IOWA.

DRAWBAR.

Application filed July 31, 1918. Serial No. 247,571.

*To all whom it may concern:*

Be it known that we, MARTIN MASON and OLE LUND, citizens of the United States, residing at Calamus, in the county of Clinton, State of Iowa, have invented a new and useful Drawbar, of which the following is a specification.

The subject of this invention is a draw bar intended, primarily, for use with harrows.

The main object of the invention is the provision of a folding draw bar which will permit passage through a confined space.

Another object of the invention is the provision of hinges for connecting the sections of the bar.

The invention also contemplates generally improving the construction and enhancing the utility of draw bars.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

A practical embodiment of the invention is shown in the accompanying drawing, wherein:—

Figure 1 is a view in front elevation of a draw bar constructed in accordance with the invention, the same being shown as attached to a harrow and in folded position;

Figure 2 is a reduced plan view of the same, a fragment of the harrow being shown.

Figure 3 is an enlarged plan view of the hinge;

Figure 4 is a sectional view of the same taken on the line 4—4 of Figure 3.

Referring to the drawing by numerals of reference:—

In carrying out the invention there is provided a bar 1 of any suitable form and material, and to the ends of this bar the sections 2, 2 are hingedly connected. The sections 2 are preferably of the same material as the main bar 1.

The hinges which connect the end sections 2 to the main bar 1 are of the strap hinge type, and consist of the strap or leaf 3, secured to the main bar 1 and which is of a width corresponding to the width of said bar and which has a rolled butt, 4, the said butt 4 adapted to enter between the rolled ears 5 of the strap or leaf 6. The straps or leaves 3 and 6 are suitably apertured for the reception of bolts, screws, or the like fastening means. Each leaf 6 is substantially triangular in shape and is secured to the inner end of section 2 with its point extending outwardly and its inner corners projecting beyond the sides of the section 2 to which it is attached. A pin 7 passes through the ears 5 and the butt 4 for the purpose of connecting the hinge sections together, and this pin is headed at each end to form a collar 8 which retains the pin in place. At one end the pin also has formed an eye 9 by which suitable draft means may be attached to the bar.

As herein shown, draft rods or links 10, 10 have their inner or rear ends connected to the eyes 9, and these links converge forwardly and have their converged ends connected by a ring or link 11 to which draft animals or the like may be hitched. These rods lie substantially in alinement with the outer edges of leaves 6 whereby the strain upon the parts is evenly distributed.

Spaced eye screws or the like, indicated by the numeral 12, may be attached to the draw bar for the purpose of receiving the attaching elements 13 which are secured to the harrow. The harrow is made in sections composed of the frames or bars 14 in which are secured the teeth 15.

As will be understood, when the end sections of the draw bar are folded over, the attached sections of the harrow are likewise folded over upon those sections of the harrow which are attached to the main bar 1. By this means, the width of the harrow and draw bar is greatly reduced so that the same may be easily drawn through the ordinary farm gate when the harrow is being brought from the field to the barnyard or place where the harrow is to be stored or kept.

Having thus described the invention, what is claimed as new and sought by Letters Patent, is:—

In a draw bar, a central section, outer sections, hinges pivotally connecting said outer sections to said central section, said hinges each comprising a narrow hinge leaf secured on the ends of the central section and corresponding in width with respect thereto, said hinge leaves being each formed with a rolled butt, substantially triangular outer hinge leaves secured to each of the outer sections and of a width to project forwardly and rearwardly thereof, the latter leaves having spaced rolled ears receiving the aforesaid butt therebetween, pins engaged through the registering ears and butts and headed at both ends, the forward ends of the pins being formed with eyes and converging draft rods connected to the eyes and lying substantially in alinement with the outer edges of the outer hinge leaves whereby the strain upon the parts is evenly distributed.

In testimony that we claim the foregoing as our own, we have hereto affixed our signatures in the presence of two witnesses.

MARTIN MASON.
OLE LUND.

Witnesses:
C. A. BLAKE,
M. S. BOYLAN.